W. H. FRIBLEY.
PHOTOPRINTING MACHINE.
APPLICATION FILED SEPT. 20, 1916.

1,246,579.

Patented Nov. 13, 1917.
7 SHEETS—SHEET 1.

Fig. 1.

WITNESSES

INVENTOR
W. H. Fribley
BY
ATTORNEYS

W. H. FRIBLEY.
PHOTOPRINTING MACHINE.
APPLICATION FILED SEPT. 20, 1916.

1,246,579.

Patented Nov. 13, 1917.
7 SHEETS—SHEET 3.

UNITED STATES PATENT OFFICE.

WILLIAM HARLAN FRIBLEY, OF RAYMOND, WASHINGTON.

PHOTOPRINTING-MACHINE.

1,246,579.  Specification of Letters Patent.  Patented Nov. 13, 1917.

Application filed September 20, 1916. Serial No. 121,156.

*To all whom it may concern:*

Be it known that I, WILLIAM H. FRIBLEY, a citizen of the United States, and a resident of Raymond, in the county of Pacific and State of Washington, have invented certain new and useful Improvements in Photoprinting-Machines, of which the following is a specification.

My invention relates to the automatic printing of photographic positives in desired quantities, and one of the main objects thereof is to provide a machine which is adaptable to various sizes of negatives, within the limits of the machine, which is adjustable to a desired field in any negative, and in which the time of exposure may be suited to the particular negative through which the prints are made.

Another object is to provide a lamp box and a frame for the sensitized paper control entirely independent of each other though adapted to be moved into operative relationship at will, either longitudinally of the machine or transversely thereof.

Another object is to provide an electrical prime mover which is actuated, together with the energizing of the lamps in the lamp box, from an ordinary lamp socket in a conventional electrical system.

Another object is to provide novel means for holding negatives of varying sizes in an immovable manner by contact with but two edges thereof.

And other objects are to provide such a machine which is simple in construction and operation, which is composed of few parts not likely to get out of order, which is very practical for both professionals and amateurs although particularly designed for the former, which is comparatively inexpensive.

My invention is fully described in the following specification, of which the accompanying drawings form a part, in which like characters refer to like parts in each of the views, and in which:—

Referring to the drawings, 13 represents a stand of any desired form though shown as a cabinet, 14 a lamp box, and 15 a frame for the sensitized paper roll and the control means, said frame being mounted on longitudinally arranged rods 15$^a$ whereby it may be adjusted longitudinally of the lamp box, this latter adjustment being also for carrying the frame into operative relationship with the lamp box, set-screws 15$^b$ being provided for locking the frame in place.

The frame 15 carries a motor 16 the shaft 17 of which is provided with two worms 18 and 19 enmeshed with worm gears 20 and 21 on shafts 22 and 23, respectively, carried in suitable bearings 24 and 25 for the respective shafts.

Figure 6:
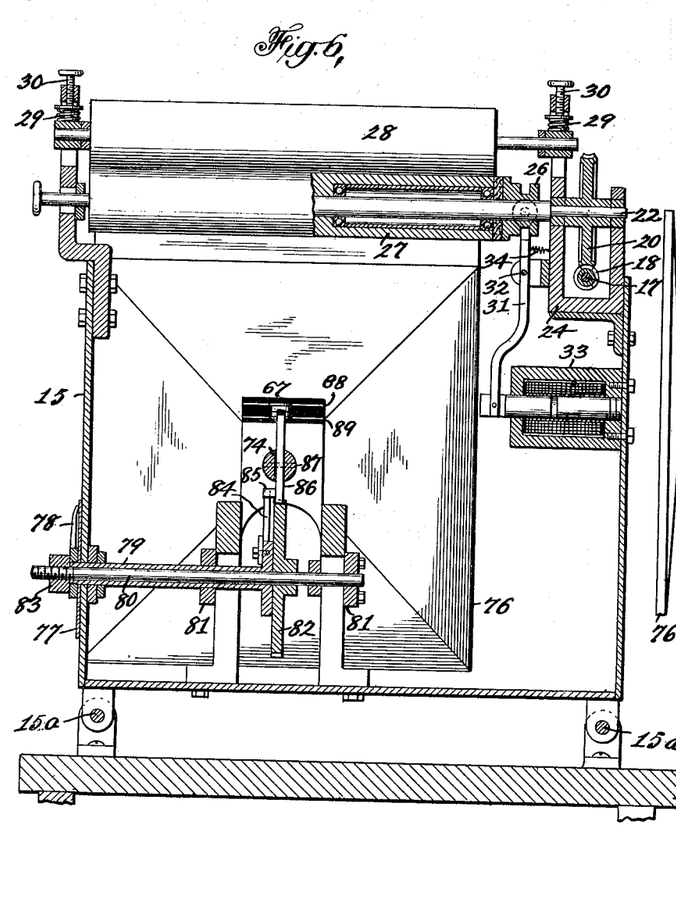
Fig. 6 is a vertical section taken on the line 6—6 of Fig. 3.

The shaft 22, Fig. 6, has a clutch 26 slidably keyed thereon and a roller 27 freely rotatable thereon, the latter preferably having anti-frictional bearings as shown in Fig. 6, in section, and the frame 15 carries a supplemental roller 28 above and in the vertical axial plane of the roller 27 and held against the latter by means of springs 29 the tension of which is controlled by screws 30. The clutch 26 is of friction type and is forced against the adjacent end of the roller 27 by means of a lever 31 pivoted at 32 and operable by means of the solenoid 33 when the latter is energized in a manner to be explained, and I provide a spring 34 to normally hold the clutch 26 away from the roller 27.

Figure 1:
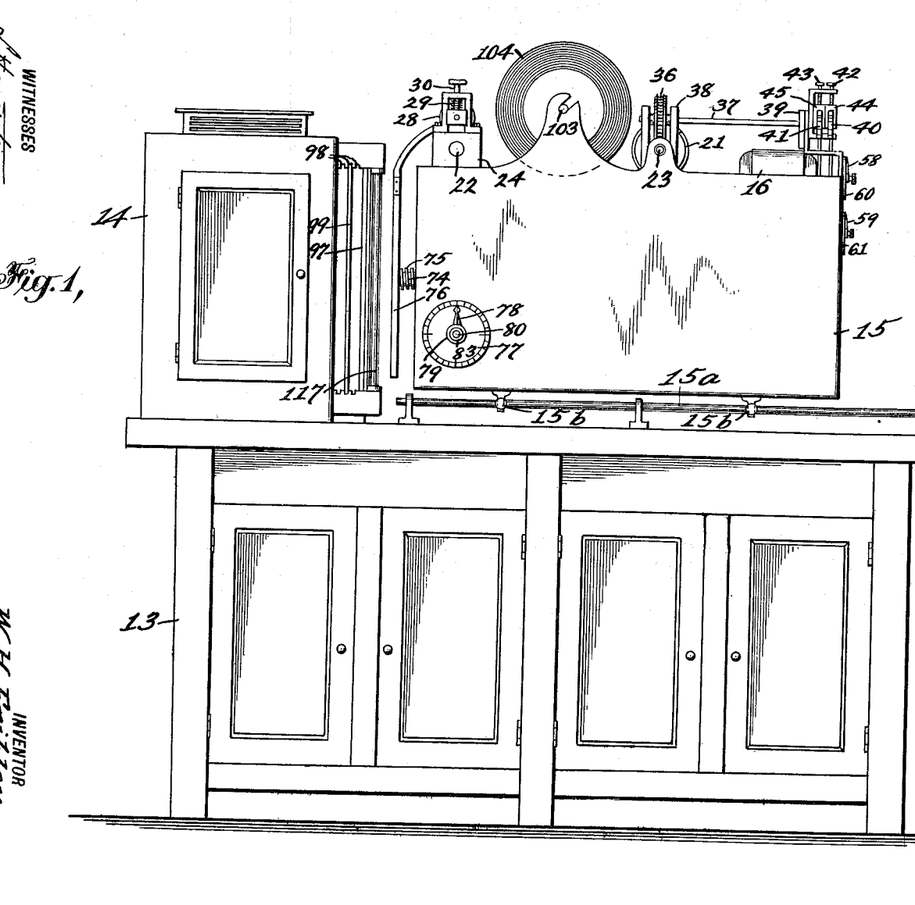
Figure 1 is a side elevation of one embodiment of my machine.
Figure 2:
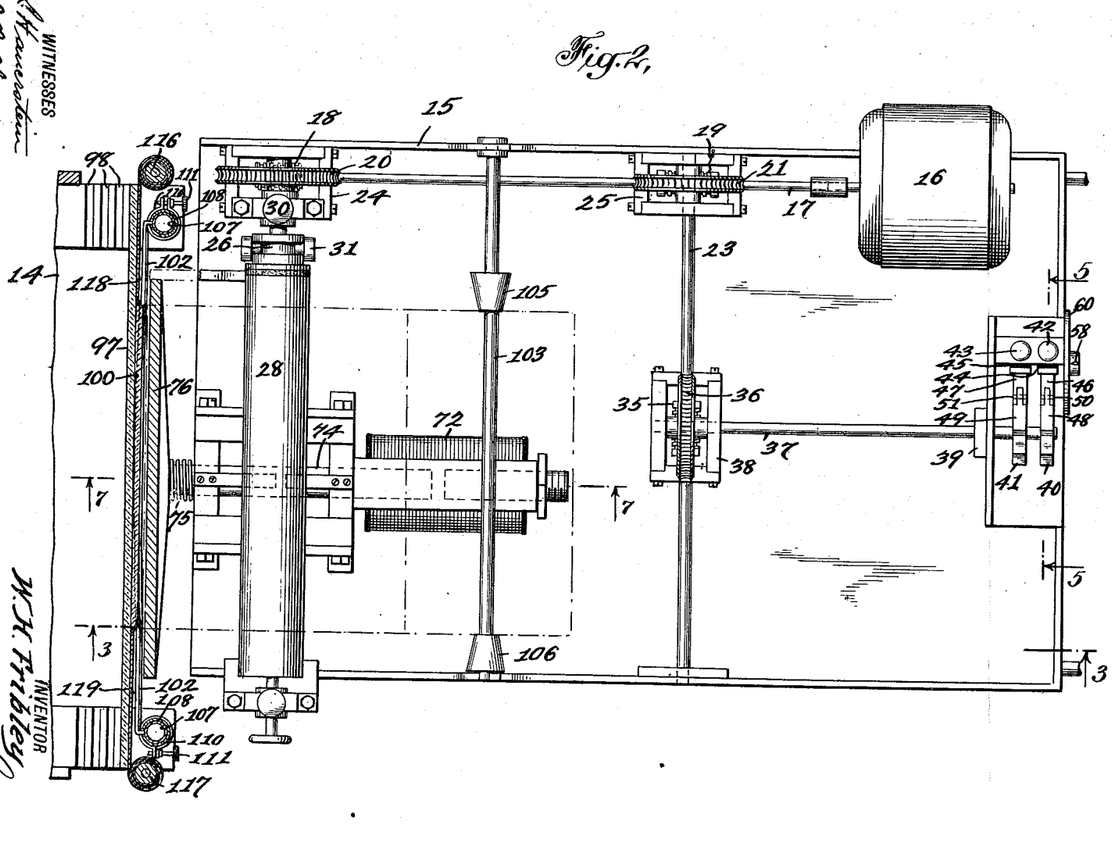
Fig. 2 is a sectional plan taken on the line 2—2 of Fig. 3.
Figure 3:
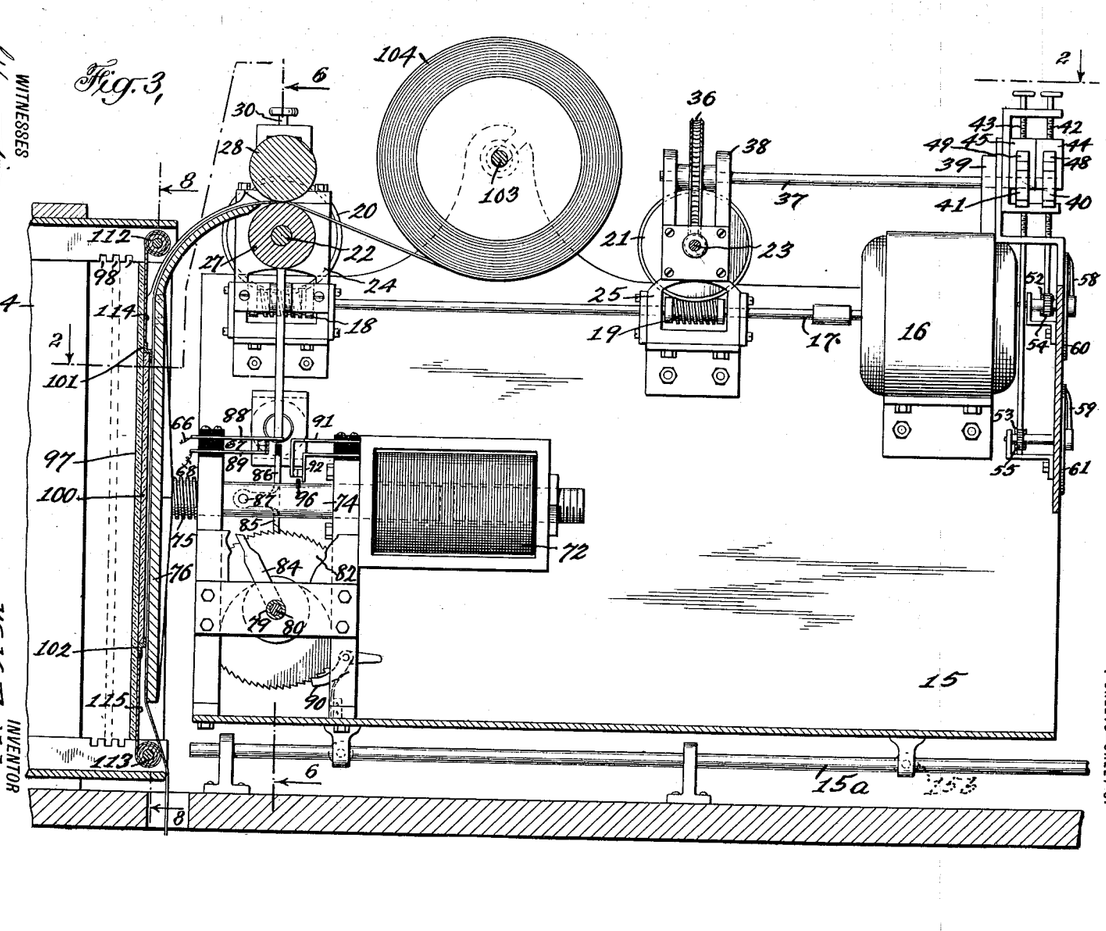
Fig. 3 is a vertical section taken on the line 3—3 of Fig. 2.
Figure 4:
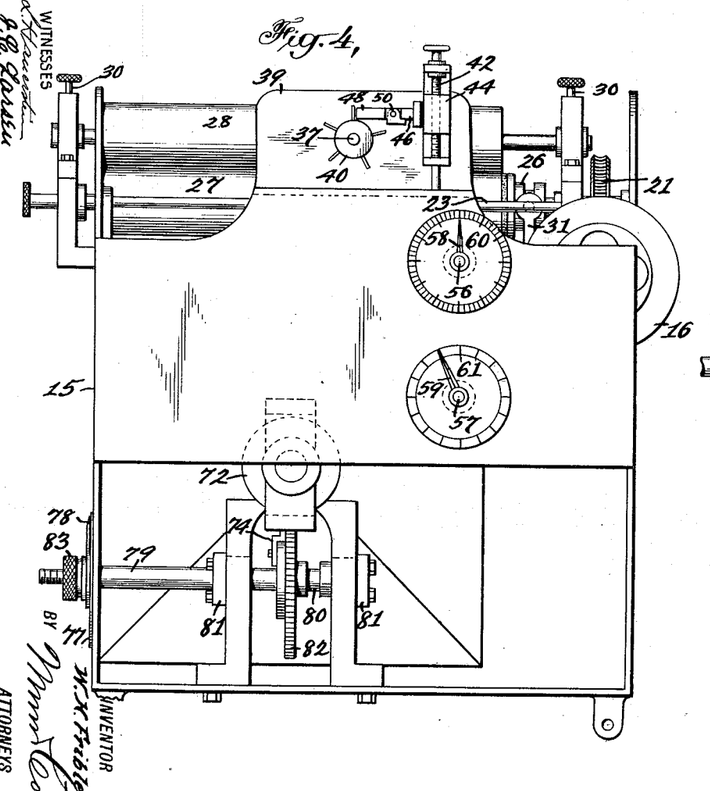
Fig. 4 is an end elevation taken at the right of Fig. 1.
Figure 5:
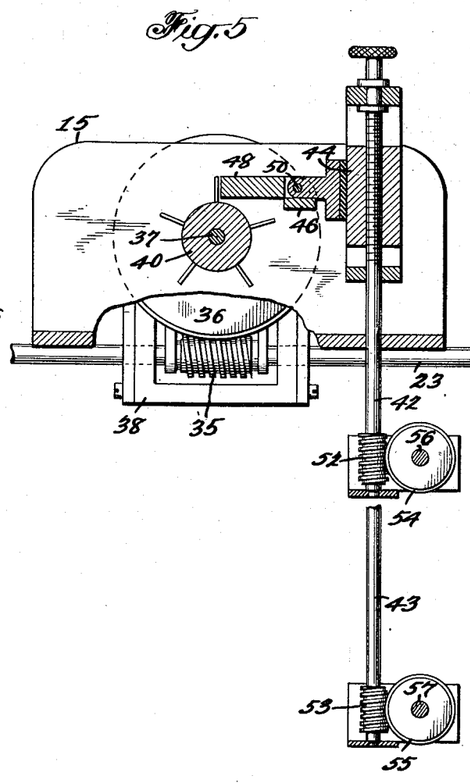
Fig. 5 is an enlarged sectional view, fragmentarily, taken approximately on the line 5—5 of Fig. 2.

The shaft 23 carries a worm 35, Figs. 2 and 3, enmeshed with a worm gear 36 on a shaft 37 in bearings 38 and extended to the right hand end of the frame 15 where it is journaled in bearings 39 and provided with two star wheels 40 and 41, Figs. 1, 2, 3, 4, 5 and 12.

Rotatably mounted in the frame 15, adjacent the star wheels 40 and 41, are two vertical screws 42 and 43 in screw-threaded engagement with blocks 44 and 45 movable in vertical guides and provided with extensions 46 and 47 insulated therefrom and provided with arms 48 and 49 pivoted at 50 and 51, respectively.

The lower ends of the screws 42 and 43 carry worms 52 and 53 enmeshed with worm gears 54 and 55 on shafts 56 and 57 carrying indicating fingers 58 and 59 exteriorly of the frame 15 and movable over dials 60 and 61, respectively. As either of the shafts 56 or 57 is rotated by means of the rotation of the respective screws 42 and 43, the degree of rotation is indicated by the respective fingers 58 and 59, and the respective blocks 44 and 45 and connected parts are correspondingly raised or lowered to carry the arms 48 and 49 thereof from or toward the star wheels 40 and 41.

Figure 12:
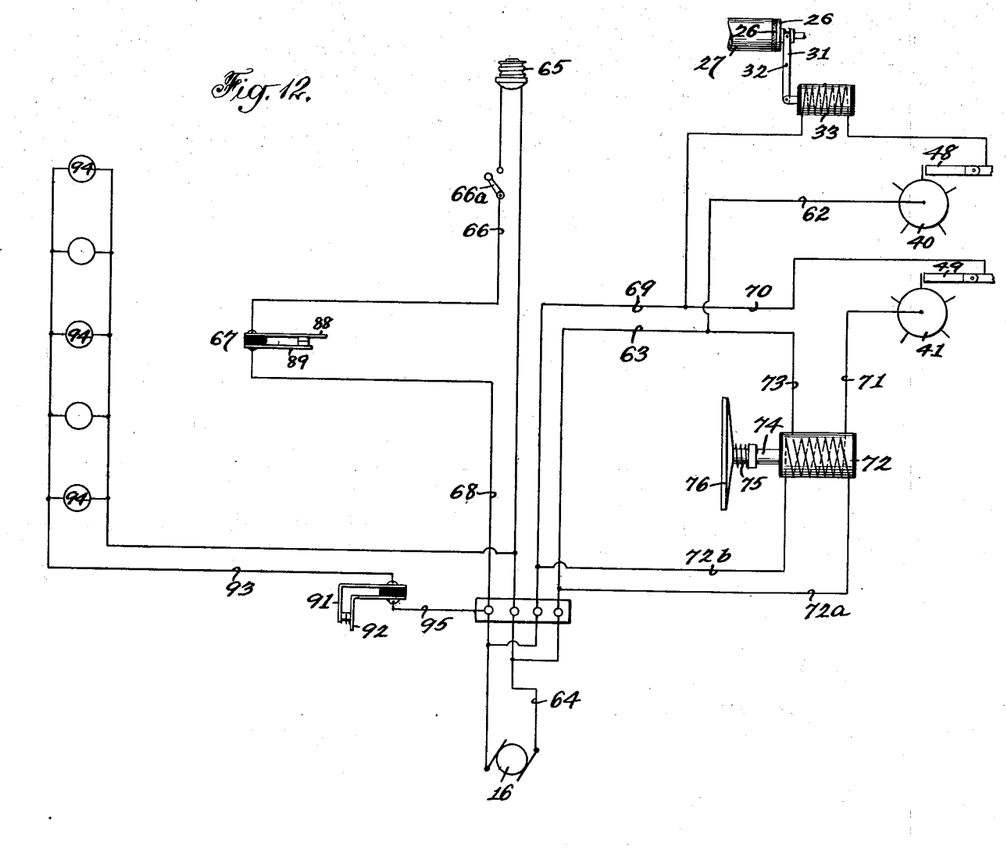
Fig. 12 is a diagrammatic view of the electrical system for the lamps, prime mover, and controls.

The star wheel 40 is in electrical connection with a conductor 62 connected to a conductor 63 in turn connected to a conductor 64 leading from one pole of the motor 16 to a plug 65 adapted for connection with an ordinary lamp socket and said plug is in electrical connection with the other pole of said motor by means of a conductor 66, contact-breaker 67, and conductor 68, Fig. 12, a conductor 69 connecting the latter with the pivoted arm 48 and, by means of an extension 70, with the arm 49, the conductor 69 leading through the solenoid 33.

The star wheel 41 is in electrical connection, by means of a conductor 71, with a solenoid 72 having two windings of one of which the last named conductor forms a part, and the continuing conductor 73 is connected with the motor conductor 64. The other winding of the solenoid 72 is connected with the conductors 69 and 63 leading to opposite poles of the motor 16, one of these windings, preferably the latter, is relatively powerful to hold the armature 74 in innermost position, whereas the other winding through the star wheels is relatively feeble to prevent arcing, this latter winding being in opposition to the former and, when in circuit, overcomes the magnetic pull of the former on the armature 74 and permits a coil spring 75 to force said armature outwardly of the solenoid, a back-plate 76 being carried on the outer end of said armature.

At the lower left hand corner of the frame 15, Fig. 1, is shown a dial 77 for a revolving indicating finger 78 keyed to a sleeve 79, Fig. 6, on a shaft 80 rotatable in bearings 81 and having a toothed wheel 82 keyed thereto and provided, in the present showing, with one hundred teeth, the outer end of the shaft 80 being threaded for a nut 83 which, when set up, binds the sleeve 79 between said nut and the wheel 82 and thus to the shaft 80 to rotate with the latter but, when the nut 83 is loosened, the shaft 80 may rotate freely within the sleeve 79 for a reason to be explained. The inner end of the sleeve 79 has a finger 84 secured thereto and provided with an inclined end adapted to engage with an inclined surface on an arm 85 carried by a rock lever 86 pivoted at 87 and the upper end of which is composed of insulating material, Fig. 3.

The insulated end of the lever 86 normally rests just beneath a spring contact 88 of a circuit-breaker shown at 67, Fig. 12, the other contact 89 of which is rigidly held and, when the inclined finger 84 engages the inclined lower end or arm 85 of the rock lever 86, said lever is swung on its pivot in the continued movement of the finger 84 in the revolution of the toothed wheel 82 and opens the circuit-breaker 67 by raising the contact 88 away from the contact 89, thus deënergizing the motor 16.

The rock lever 86 is pivoted to the armature 74 and moves therewith, the lower inclined end of said lever resting normally on the toothed edge of the wheel 82 and said wheel is moved the distance of one tooth in the outward and inward movement combined of the said armature, a pawl 90 being provided to prevent backward wheel movement.

If a limited number of prints is desired, say five, the indicating finger 78 is moved five spaces backwardly on the dial 77, the nut 83 having been loosened for the purpose, after which the nut is again tightened. In the outward movement of the armature 74 and its subsequent backward movement the wheel 82 is revolved one degree and when said wheel has been rotated five degrees the rock lever 86 is raised clear of the wheel and no more revolution thereof occurs.

The lamp box 14 is provided with a desired number of electric lamps shown diagrammatically in Fig. 12 in electrical connection with the motor conductors 64 and 68 through a circuit-breaker, Figs. 3 and 12, comprising a fixed contact 91 and a spring contact 92, the former having a conductor 93 leading through the lamps 94 and the latter having a conductor 95 leading to the motor conductor 68. The armature 74 is provided with an insulated pin 96 the path of movement of which, in the inward armature movement, is in the plane of the spring contact 92 whereby the contacts 92 and 91 are separated to break the lamp circuit in the complete inward armature movement and said circuit is again closed upon the outward armature movement.

Figures 9, 10, 11:
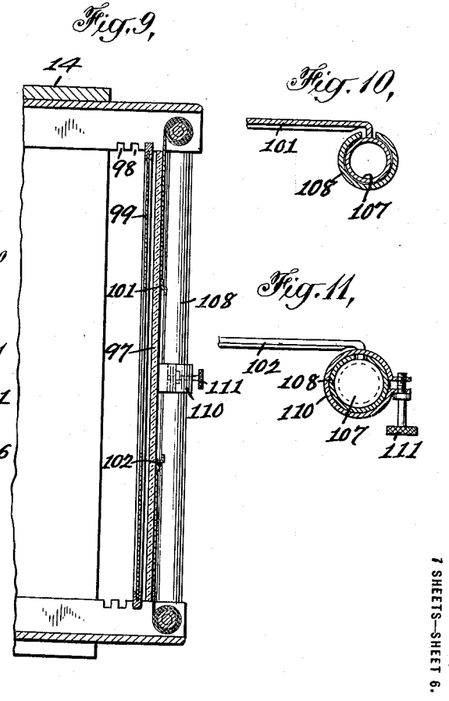
Fig. 9 is a vertical section taken on the line 9—9 of Fig. 8.
Fig. 10 is an enlarged fragmentary section taken on the line 10—10 of Fig. 8.
Fig. 11 is a similar section taken on the line 11—11 of Fig. 8.

The lamp box 14 is provided with a stationary glass plate 97, Figs. 3 and 9, and with a plurality of grooves 98 adapted to receive vignettes one of which is shown at 99, Fig. 9, and the negative 100 is adapted to be held against the front of the plate 97 by means of horizontally arranged bars 101 and 102 of peculiar construction, mounting, and operation.

Carried by the frame 15 is a transverse shaft 103 serving as a support for a roll 104 of sensitized paper, cones 105 and 106 being provided to center or aline the roll 104, the paper from said roll being led forwardly between the rollers 27 and 28 and downwardly over the outer face of the back or pressure-plate 76 in line with the negative 100.

Figure 8:
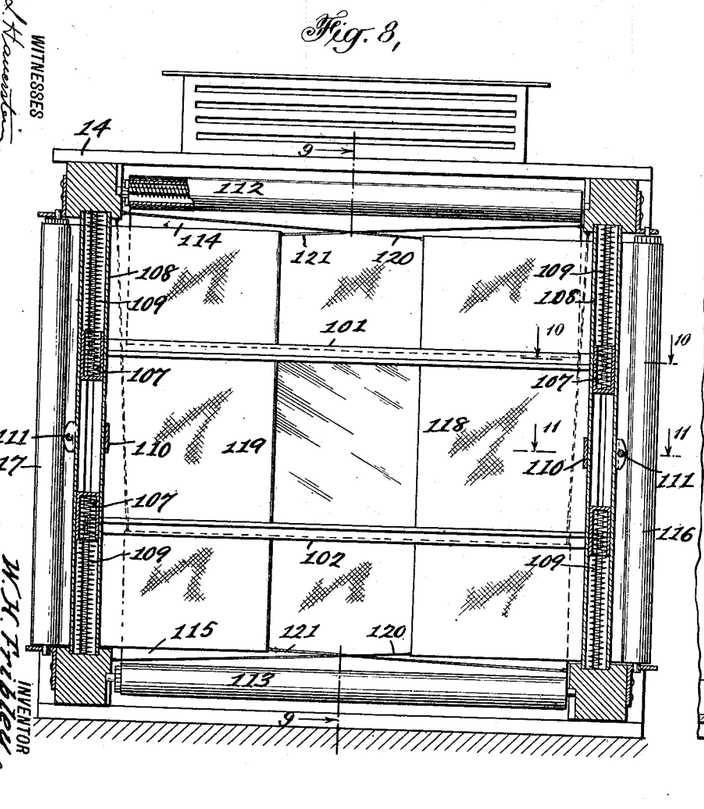
Fig. 8 is a vertical section taken on the line 8—8 of Fig. 3.

The ends of the bars 101 and 102 are connected with cup-shaped tubes 107, Figs. 8, 10 and 11, slidable in vertical fixed tubes 108 slotted at their rear sides to permit the entry of the ends of the bars to engage the tubes 107, the tubes 107 in each tube 108 being normally forced toward each other by means of coil springs 109, this tendency however being controlled by means of a clamp 110 on each tube 108 provided with a screw 111 whereby the respective tubes 108 may be compressed to lock the cup-shaped tubes 107 in desired positions and thus hold the bars 101 and 102 in adjusted positions, in separated horizontal planes.

These bars 101 and 102 are recessed in adjacent edges to receive the negative 100 and thus hold the latter in a desired vertical adjustment, the individual adjustability of the said bars adapting the same to various dimensions of negatives, within the limits of the machine. I form each of said bars on an arc of a circle, Fig. 2, whereby the negative is held in frictional engagement with the fixed glass plate 97 and thereby prevent lateral movement of the negative after the negative has been adjusted to a desired position.

The lamp box is provided, adjacent the fixed plate 97, with two horizontal spring actuated rollers 112 and 113, top and bottom, for curtains 114 and 115, respectively, movable toward and from each other and secured in adjusted relationship by means of tapes in the usual manner, Fig. 8, somewhat similar to the focal plane shutters of cameras, although the tape winding rods are omitted in my machine.

The lamp box is also provided with vertical spring actuated rollers 116 and 117 at the sides thereof for curtains 118 and 119 also provided with adjusting tapes, shown at 120 and 121, respectively, in Fig. 8, and it will be seen that any size print may be made from a larger negative by means of the adjustable curtains, or the print may be the same size as the negative.

The star wheel 40 constitutes a part of the mechanism controlling the amount of sensitized paper fed forwardly for each exposure, as for different dimensions of positive prints, whereas the star wheel 41 is a part of the mechanism controlling the duration of exposure, and these star wheels may be adjusted relatively to each other on the shaft 37 in order to prevent paper feed during exposure and to insure such feed immediately after exposure, the adjusting means not being detailed as simple set-screws are sufficient and are well within the ability of a mechanic to install the same.

As will be understood, the higher the pivoted arms 48 or 49 are adjusted the longer time it takes for the respective star wheel arms to reach the same to close the corresponding circuit, and thus the amount of paper fed and the duration of exposure is readily controlled.

When the star wheel 40, Fig. 12, engages the arm 48 a circuit is closed through the solenoid 33, conductors 69, 68, contacts 88 and 89, conductor 66 through switch 66$^a$, plug 65, conductor 64, motor 16, conductor 62 and star wheel 40, thereby energizing the solenoid 33 to force the clutch 26 into engagement with the roller 27 and also energizing the motor to rotate the roller 27 to feed the paper forwardly, and the lower the pivoted arm 48 the longer the circuit is closed and the greater the amount of paper fed forwardly in each actuation for each exposure.

As previously stated, when the control for the number of prints is moved step by step until the contacts 88 and 89 are forced apart to break the circuit, the motor is deënergized and the paper feed stops.

When the star wheel 41 engages the pivoted arm 49 a circuit is closed through conductors 70, 69, and 68, contacts 88 and 89, conductor 66 and switch 66$^a$, plug 65, conductor 64 and motor 16, conductor 73 of the feeble winding of the solenoid 72, conductor 71 and star wheel 41, thus counteracting the normal magnetic pull of the more powerful winding of this solenoid through the conductors 72$^a$ and 72$^b$, and the armature 74 may move outwardly because of the spring 75, this continuing until the star wheel 41 is disengaged from the arm 49, at which time the more powerful current in the winding 72$^a$ and 72$^b$ retracts the armature 74 against the spring 75, thereby controlling the duration of exposure.

Figure 7:
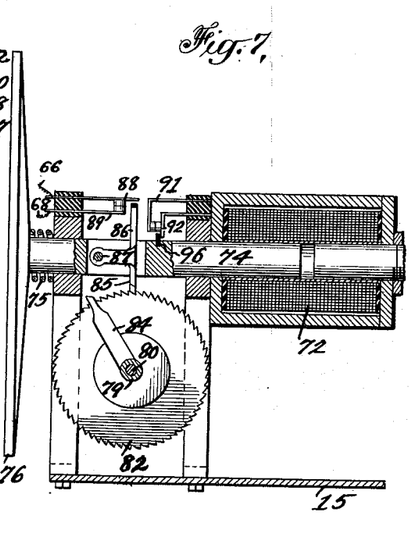
Fig. 7 is a fragmentary vertical section taken on the line 7—7 of Fig. 2.

In the outward position of the armature 74 the contacts 91 and 92 close a circuit through the lamps 94, as already explained, but upon the retracting of the armature the pin 96 on the armature forces the contact 92 away from the contact 91 and the lamp circuit is broken, thereby energizing the lamps only when a portion of sensitized paper is held to the negative by means of the pressure plate 76 on the armature 74, the exposure position of the parts being shown in Figs. 2 and 3, the paper feed position of the parts being shown in Figs. 1 and 7, and the moment of deënergizing the lamps being shown in the latter.

When the machine is not in use the frame 15 may be slid away from the lamp box but when it is desired to begin printing the frame 15 is moved toward the lamp box until the pressure-plate 76, in outward position, bears firmly against the negative 100 and against the paper between the negative and the pressure-plate where it had been manually led initially and where it is automatically fed thereafter, and the machine is ready for use.

From the foregoing it will be seen that I may print a specified number of photographic positives of any size within the limits of the machine, or I may print continuously limited only by the length of the sensitized paper strip forming the roll 104, and I may select any part of a negative for printing, I may also feed the correct length of paper for the particular size of prints, and I may control the exposure to suit the particular negative, as for more or less density.

The negative is quickly and easily installed and firmly held thereafter, its relative position is under control both as to vertical and horizontal alinement with respect to the sensitized paper, and the adjustable curtains enable an operator to print through any desired portion of the negative, and I may also use desired vignettes between the negative and the lamps.

I do not limit myself as to the dimensions of the machine, as will be understood, and I may adapt the same to the standard motion picture film, this being arbitrary, and it will be seen that I provide a machine of this class which is simple in construction and adjustment, entirely automatic in action, very practical, comparatively inexpensive, and possessing a considerable degree of latitude in the adjustments.

Having fully described my invention, what I claim as new, and desire to secure by Letters Patent, is:—

1. A machine of the class described, comprising a support, a lamp box thereon having lamps therein, a carrier frame thereon for a roll of sensitized paper, means for feeding said paper intermittently toward said box, means for energizing said lamps intermittently.

2. A machine of the class described, comprising a support, a lamp box thereon having lamps therein, a carrier frame thereon for a roll of sensitized paper, means for feeding said paper intermittently toward said box, means for controlling the amount of paper fed, and means for energizing said lamps intermittently.

3. A machine of the class described, comprising a support, a lamp box thereon having lamps therein, a carrier frame thereon for a roll of sensitized paper, means for feeding said paper intermittently toward said box, means for controlling the duration of periods between said feeds, and means for energizing said lamps intermittently.

4. A machine of the class described, comprising a support, a lamp box thereon having lamps therein, a carrier frame thereon for a roll of sensitized paper, means for feeding said paper intermittently toward said lamp box, means for energizing said lamps intermittently, and means for controlling the periods of lamp actuation.

5. A machine of the class described, comprising a support, a lamp box thereon having lamps therein, a carrier frame thereon for a roll of sensitized paper, means for feeding said paper intermittently toward said box, a pressure-plate, means for forcing the same against said box intermittently to hold said paper, and means for energizing said lamps during the forcing operation of said pressure-plate.

6. A machine of the class described, comprising a support, a lamp box thereon having lamps therein, a carrier frame thereon for a roll of sensitized paper, means for feeding said paper intermittently toward said box, a pressure-plate, means for forcing the same against said box intermittently to hold said paper, means for energizing said lamps in the forcing operation of said pressure-plate, and means for deënergizing said lamps upon the retraction of said pressure-plate.

7. A machine of the class described, comprising a support, a lamp box thereon having lamps therein, a carrier frame thereon for a roll of sensitized paper, paper feeding rolls on said carrier, means for actuating said rolls intermittently, means for holding said paper against said box between feeding operations, and means for energizing said lamps in the operation of said holding means.

8. A machine of the class described, comprising a support, a lamp box thereon having lamps therein, a carrier frame thereon for a roll of paper, feeding rolls for said paper, means for actuating said rolls intermittently, means for controlling the periods of actuation thereof, means for holding said paper against said box between feeding operations, and means for energizing said lamps during the operation of said holding means.

9. A machine of the class described, comprising a support, a lamp box thereon having lamps therein, a carrier frame thereon for a roll of sensitized paper, feed rollers for said paper, means for actuating said rollers, means for holding said paper against said lamp box, means for controlling the periods of operation of said holding means, and means for energizing said lamps during the operation of said holding means.

10. A machine of the class described, comprising a support, a lamp box thereon having lamps therein, a carrier frame thereon for a roll of sensitized paper, means for feeding said paper intermittently toward said box, means for holding said paper against said box between feeding operations, means for automatically controlling the number of printing operations, and means for energizing said lamps between paper feeding operations.

11. A machine of the class described, comprising a support, a lamp box thereon having lamps therein, a carrier frame thereon for a roll of sensitized paper, means for feeding said paper intermittently toward said box, means for holding said paper against said box between feeding operations, means for energizing said lamps during the operation of said holding means, a step-by-step mechanism operable by said holding means, a motor, and means for stopping said motor after a desired number of step-by-step operations.

12. A machine of the class described, comprising a support, a lamp box thereon having lamps therein, a carrier frame thereon for a roll of sensitized paper, means for feeding said paper intermittently toward said box, means for holding said paper against said box between feeding operations, means controlled by said holding means for energizing said lamps and for deënergizing the same, means for controlling the duration of holding operations, and means for controlling the duration of feeding operations.

WILLIAM HARLAN FRIBLEY.

Witnesses:
C. E. MEREDITH,
E. E. SOLKETT.